United States Patent

[11] 3,566,140

| [72] | Inventor | Carl-Erik Granqvist<br>Lindingo, Sweden |
|---|---|---|
| [21] | Appl. No. | 810,594 |
| [22] | Filed | Mar. 26, 1969 |
| [45] | Patented | Feb. 23, 1971 |
| [73] | Assignee | AGA Aktiebolag<br>Lindingo, Sweden |
| [32] | Priority | Mar. 27, 1968 |
| [33] | | Sweden |
| [31] | | 4058/68 |

[54] ARRANGEMENT FOR MEASURING RELATIVE DISPLACEMENT UTILIZING RELATIVELY MOVABLE SHUTTERS WHICH CONTROL THE PASSAGE OF MODULATED LIGHT
9 Claims, 4 Drawing Figs.

[52] U.S. Cl. .................................................. 250/227,
250/231, 350/96
[51] Int. Cl. .................................................. H01j 39/12
[50] Field of Search........................................... 250/231,
207, 237, 227, 231 (SE); 350/96

[56] References Cited
UNITED STATES PATENTS

| 3,167,605 | 1/1965 | Heidenhain .................. | 250/231X |
| 3,446,971 | 5/1969 | Ruddock ....................... | 250/207 |

FOREIGN PATENTS

| 198,652 | 12/1964 | Sweden ....................... | |

Primary Examiner—Archie R. Borchelt
Assistant Examiner—C. M. Leedom
Attorney—Larson, Taylor and Hinds ABSTRACT: An apparatus for measuring the relative displacement of an object includes a stationary shutter and a movable shutter which control the light passing from a modulated light source to a light receiver. The movable shutter includes a plurality of secondary slots inclined relative to a primary slot in the stationary shutter so that light will pass through different portions of the primary slot depending on the position of the secondary slots relative thereto. The light receiver may comprise a plurality of photocells arranged relative to the primary slot such that the individual outputs thereof depend on the portion of the primary slot uncovered. The outputs of the photocells are each delayed by a different amount and are combined to produce a resultant signal whose phase is compared with the signal used to modulate the light source.

PATENTED FEB 23 1971 3,566,140

INVENTOR
CARL-ERIK GRANQVIST

BY Larson and Taylor
ATTORNEYS

3,566,140

ARRANGEMENT FOR MEASURING RELATIVE DISPLACEMENT UTILIZING RELATIVELY MOVABLE SHUTTERS WHICH CONTROL THE PASSAGE OF MODULATED LIGHT

FIELD OF THE INVENTION

The present invention relates to an apparatus for measuring the relative displacement of a movable member.

BACKGROUND OF THE INVENTION

In many applications it is desired to measure the displacement of a movable member with a high degree of accuracy and to provide such a measurement without the application of mechanical forces to the member which might disturb the member in the movement thereof. One such application is the navigation of aircraft by gyroscopes, such gyroscopes being extremely sensitive to mechanical forces exerted thereon. Many other situations require accurate measurement of the displacement of a movable member such as in the control of machine tools. The operating elements of such tools often have to be adjusted to within thousandths of a millimeter or less. It will be appreciated that displacement measurements of this kind present a number of difficulties particularly in the area of providing extreme accuracy.

In accordance with one prior art approach displacement of a member is measured without exerting mechanical forces thereon through the use of light transmitted through gratings having alternately disposed transparent and opaque sections. Where the gratings are disposed parallel to each other and the sections are equally spaced on each of two relatively movable members, the transmission of light to the two gratings will vary periodically between a maximum and minimum value. Where the spacing is very small an accurate measurement of the displacement may be obtained by counting the oscillations of the light. However, this arrangement does not permit measurement of displacements substantially smaller than the spacing in question. Reference is made to U.S. Pat. No. 3,218,911 for a more complete description of such a system. In a similar system utilizing light (and more completely described in U.S. Pat. No. 3,198,061), light from a light source is split into two beams having different polarizations, one of the two beams being displaced relative to the other. This approach permits the determination to some extent of intermediate values of displacement corresponding to a fraction of the period of the output signal provided.

SUMMARY OF THE INVENTION

In accordance with the present invention a displacement measuring system is provided which permits more accurate interpolation between values corresponding to complete periods of an output signal than could be achieved hereinbefore.

In accordance with a presently preferred embodiment of the invention, light passing from a light source to a light receiver is controlled by a pair of shutters, one of which is movable relative to the other. The movable shutter includes a plurality of secondary slots therein which are inclined relative to a primary slot located in the fixed shutter so that movement of the movable shutter will cause light to pass through different portions of the primary slot as these portions are uncovered. The light receiver comprises means responsive to light passing thereto as determined by the position of the secondary slots relative to the primary slot for producing an output signal related to the relative displacement of the movable shutter. In a first embodiment the light receiver may comprise a plurality of photocells which are arranged to receive light passing from the light source, the amount of light falling on any particular photocell being a function of the portion of the primary slot uncovered for a particular position of the movable shutter. The output of each photocell is delayed by a different amount and the outputs are combined to produce a resultant signal the phase of which is indicative of the displacement of the movable shutter. The phase of the resultant signal is measured by a phase comparator which compares the phase of the resultant signal with the phase of a signal for modulating the light source.

Further features and advantages of the present invention will be set forth in or apparent from the detailed description of a presently preferred embodiment of the invention found hereinbelow.

DESCRIPTION OF THE PREFERRED EMBODIMENTS

Figure 1:
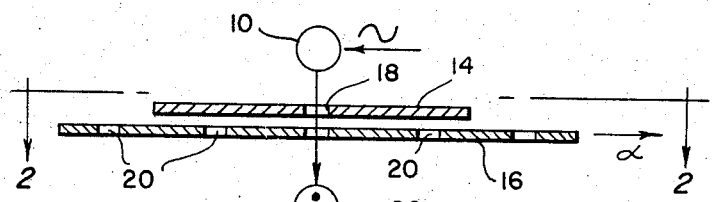
FIG. 1 is a schematic representation in section of the shutter arrangement in accordance with a presently preferred embodiment of the invention.
Figure 2:
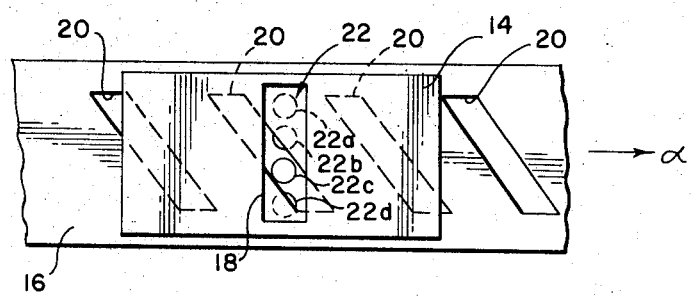
FIG. 2 is a view taken generally along line 2–2 of FIG. 1.

Referring to FIGS. 1 and 2 a light source 10 transmits light to a light receiver generally denoted 12 through a control arrangement including first and second shutters 14 and 16. Shutter 14 which is stationary includes a primary slot 18 located therein whereas shutter 16 which is adapted to be affixed to the object whose displacement is to be measured includes a plurality of slots 20 which are inclined relative to primary slot 18. Light receiver 12 comprises a plurality of photocells 22 arranged in a row parallel to primary slot 18. As can best be appreciated from considering FIG. 2 it is noted that the inclination of slots 20 relative to primary slot 18 will cause the different portions of slot 18 to be uncovered as movable shutter 16 is displaced. For example, for the position of shutter 16 shown in FIGS. 1 and 2 there will be maximum illumination of photocell 22c whereas the remaining photocells 22a, 22b and 22d will be unilluminated or only partially illuminated by light source 10. Thus photocells 22 are each responsive to different portions of primary slot 18 being uncovered.

Figure 3:
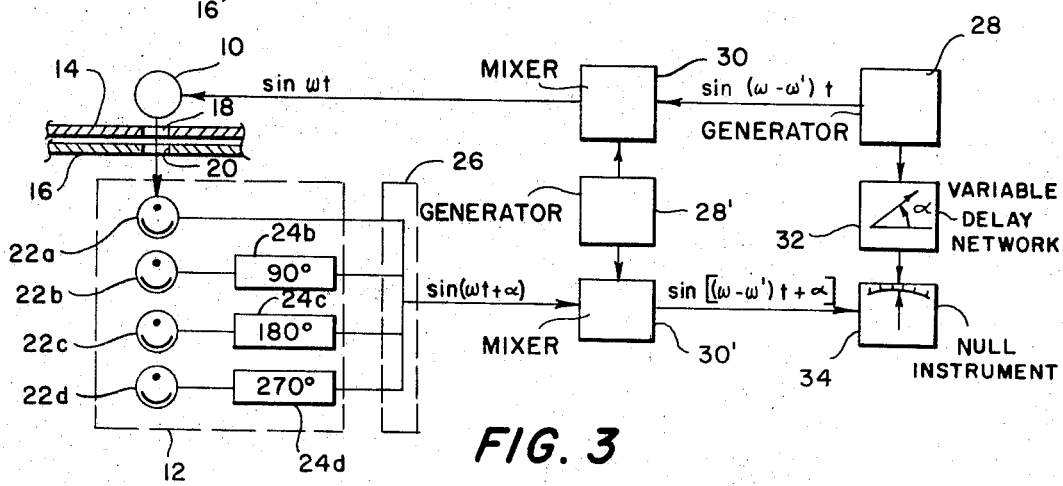
FIG. 3 is a schematic circuit diagram of a first embodiment of the overall system of the present invention.

Referring to FIG. 3, the shutter arrangement of FIGS. 1 and 2 is shown incorporated in a complete system. Light source 10 is modulated by a primary signal sin $\omega t$ and light therefrom is transmitted to photocells 22 which form part of light receiver 12 as described hereinabove. Further, the individual photocells 22a to 22d will be fully illuminated in turn as movable shutter 16 is displaced in one direction. Photocells 22b, 22c and 22d are connected through delay lines 24b, 24c and 24d to a combining circuit 26 whereas photocell 22a is directly connected to combining circuit 26. Delay line 24b, 24c and 24d provided delays of 90°, 180° and 270° respectively so that the outputs of the successive photocells 22 are delayed by 90° relative to the preceding one. Combining circuit 26 produces an output signal whose phase depends upon the displacement of shutter 16 from an initial reference position, this displacement being denoted $\alpha$. The output signal from combining circuit 26 is thus approximately of the form $\sin(\omega t + \alpha)$ $\alpha$ being the phase angle relative to the modulating signal applied to light source 10 and corresponding to the displacement of shutter 16. Hence, with shutter 16 located in a position wherein photocell 22a receives maximum illumination and the remaining photocells are substantially unilluminated and phase angle $\alpha$ has the value zero, photocell 22a being directly connected to combining circuit 26. Similarly, if shutter 16 is in a position where photocell 22b is fully illuminated $\alpha$ will then have a value of $\pi/2$, the output of photocell 22b being delayed by 90° by delay line 24b. Under these circumstances the resultant output signal of combining circuit 26 is of the form $\sin(\omega t + \pi/2)$.

The phase angle $\alpha$ may be obtained by directly measuring the phase of the signal produced by combining circuit 26 relative to the phase of the modulating signal applied to light source 10. However, for reasons which will become more apparent upon consideration of the embodiment of FIG. 4 a difference frequency is preferably utilized for phase measurement. This frequency, which is designated $\omega-\omega'$ is generated by a generator 28 and applied to a heterodyning input of mixer 30. A heterodyne frequency $\omega'$ is applied to a second input of mixer 30 from a further generator 28'. Thus the output signal from mixer 30 is of the form $\sin \omega t$ and it is this signal which is applied to light source 10. It will be appreciated that because only the frequency or the phase of the various signals discussed is of interest all amplitudes have been assumed to have the value unity.

A heterodyning process similar to that described above is performed at the receiving end of the system in a further heterodyning mixer 30' which includes a first input connected to further generator 28' and a second input connected to combining circuit 26. Mixer 30' produces an output signal having a frequency $\omega-\omega'$ and a phase angle $\alpha$ which is applied to a phase comparator formed by an adjustable delay network 32 and a null instrument 34. The output signal from generator 28 is applied to adjustable delay network 32 which is adjusted until null instrument 34 reads zero. Null instrument 34 measures the difference in phase between the signals applied thereto and thus the setting of variable delay network 32 corresponding to a zero reading for null instrument 34 is a measure of the phase angle $\alpha$ and thus the displacement of shutter 16. Variable delay network 32 is graduated in degrees of phase difference and thus the value $\alpha$ may be directly read therefrom.

It will be appreciated that slots 18 and 20 should be suitably shaped so that the light falling on photocells 22 will produce a good approximation of the $\sin(\omega t + \alpha)$ signal. Further, the number of photocells utilized may be varied from that shown. It will be also appreciated that the phase of the outputs of these photocells will of course each be delayed by a suitable amount so that the signals produced by the cell or cells illuminated for a particular position of shutter 16 will be combined in circuit 26 to produce a signal whose phase is accurately reflective of the amount of light falling on each of the various cells.

Figure 4:
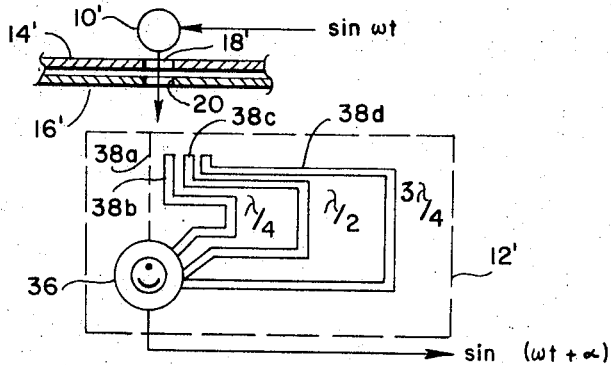
FIG. 4 is a schematic representation of a portion of the system of FIG. 3 modified in accordance with a second embodiment of the invention.

Referring to FIG. 4, a single photocell 36 is utilized to generate the secondary signal $\sin(\omega t + \alpha)$. In the embodiment of FIG. 4, delay lines 24b, 24c and 24d are replaced by optical conductors 38b, 38c and 38d, respectively. As indicated in FIG. 4, the lengths of optical conductors 38b, 38c and 38d are integral multiples of a quarter wavelength $\lambda/4$ corresponding to the modulation frequency $\omega$. A direct path between light source 10' and photocell 36 is indicated by dashed line 38a. In operation, light from a light source 10' is controlled by a slot 18' in shutter 14' and slots 20' in shutter 16' in the same manner as described hereinabove. The light transmitted by light source 10' will pass to common photocell 36 through a path determined by the relative position of shutter 16' to shutter 14' and the phase of the output of photocell 36 will be dependent upon which of these paths the light travels. The output of photocell 36 which is of the form $\sin(\omega t + \alpha)$ is treated in a manner similar to that described above with reference to FIG. 3. The modulating signal for light source 10' is also produced in the same way. It will be appreciated that for the embodiment of FIG. 4 it is preferable that $\omega$ have a very high value in order that the light conductors 38 may be of a reasonable length. Because it is not practical to measure phase differences at these extremely high frequencies the heterodyning arrangement utilized for frequency-transposing purposes described hereinabove is particularly advantageous herein.

It will be understood by those skilled in the art that the embodiments of the invention shown and described herein are subject to various other modifications without departing from the scope and spirit of the invention. Accordingly, it should be understood that the invention is not limited by the exemplary embodiments shown and described.

I claim:

1. An apparatus for measuring the relative displacement of an object in a predetermined direction comprising, a light source for transmitting light; signal generator means for modulating said light source with a primary signal; a light receiver for receiving the modulated light transmitted by said light source; first shutter means including a primary slot therein for controlling the light passing to said light receiver from said light source; second shutter means including a plurality of secondary slots therein for controlling the light passing through said primary slot to said light receiver, said secondary slots being inclined relative to said primary slot, and one to said shutter means being movable in said predetermined direction relative to the other of said shutter means; said light receiver comprising means responsive to light passing thereto as determined by the position of said secondary slots relative to said primary slot for producing an output signal related to the relative displacement of said second shutter means; and phase comparator means for measuring the phase difference between the output signal and said primary signal.

2. An apparatus as claimed in claim 1 wherein movement of said secondary slots relative to said primary slots permits passage of light through different portion of said primary slots and wherein said light receiver includes means for generating a plurality of secondary signals the individual phases of which correspond to different portions of set primary slot, said secondary apparatus further comprising means for combining said secondary signals to produce said output signal.

3. An apparatus as defined claimed in claim 2 wherein said primary signal comprises a sinusoidal signal.

4. An apparatus as claimed in claim 2 wherein said light receiver comprises a plurality of photocells and a plurality of delay lines individually connected to said photocells for providing different signal delays in said plurality of secondary signals.

5. An apparatus as claimed in claim 2 further comprising a heterodyning mixer including a first input connected to said signal generator means, a second input connected to a further signal generator means, and an output connected to said light source.

6. An apparatus as claimed in claim 5 further comprising a further heterodyning mixer including a first input connected to said additional generator means, a second input connected to said combining means and an output connected to said phase comparator means.

7. An apparatus as claimed in claim 1 wherein said light receiver comprises a plurality of light conductors of different lengths for conducting light to a common photocell, the output of said photocell comprising said output signal.

8. An apparatus as claimed in claim 7 further comprising signal generator means for modulating said light source with a primary signal and phase comparator means for measuring the phase difference between said output signal and said primary signal.

9. An apparatus as claimed in claim 8 further comprising a first heterodyning mixer including a first input connected to said generator means, a second input connected to a further generator means, and an output connected to said light source and a further heterodyning mixer including a first input connected to said further generator means, a second input connected to the output of said common photocell, and an output connected to said phase comparator means.